US007224409B2

(12) United States Patent
Chin et al.

(10) Patent No.: US 7,224,409 B2
(45) Date of Patent: May 29, 2007

(54) CHANNEL TUNING METHOD AND TELEVISION USING CHANNEL NAME AUTO COMPLETION FUNCTION

(75) Inventors: Dae-je Chin, Seoul (KR); Kyung-ah Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 533 days.

(21) Appl. No.: 10/347,186

(22) Filed: Jan. 21, 2003

(65) Prior Publication Data
US 2003/0137605 A1    Jul. 24, 2003

(30) Foreign Application Priority Data
Jan. 21, 2002  (KR) ............................ 2002-0003285

(51) Int. Cl.
*H04N 5/445* (2006.01)
*H04N 5/45* (2006.01)
(52) U.S. Cl. ..................... 348/732; 348/731; 348/565; 348/564; 725/38; 725/57
(58) Field of Classification Search ................ 348/565, 348/563, 564, 733, 569, 731, 553, 732; 725/57, 725/38, 39, 40, 43, 53
See application file for complete search history.

(56) References Cited

U.S. PATENT DOCUMENTS

| 5,161,019 A * | 11/1992 | Emanuel ...................... 725/56 |
| 5,528,304 A * | 6/1996 | Cherrick et al. ............... 725/41 |
| 6,215,531 B1* | 4/2001 | Beery ........................ 348/734 |
| 6,249,320 B1* | 6/2001 | Schneidewend et al. .... 348/569 |
| 6,600,522 B1* | 7/2003 | Kim ........................... 348/732 |
| 6,766,526 B1* | 7/2004 | Ellis ........................... 725/57 |

* cited by examiner

*Primary Examiner*—Michael Lee
*Assistant Examiner*—Jean W. Désir
(74) *Attorney, Agent, or Firm*—Sughrue Mion, PLLC

(57) ABSTRACT

A channel tuning method and a television using a channel name auto completion function in which the entire channel name of a corresponding channel is automatically completed by inputting part of a channel name of a television broadcasting channel to be tuned using a predetermined inputting unit. The channel tuning method includes (a) searching similar channel names based on one or more of the characters of a channel name input by the inputting unit and displaying the searched channel names on a list from which selections can be made, and (b) in order to aid a user in selecting a channel, automatically tuning a corresponding channel among channels corresponding to the channel names displayed on the list for a predetermined interval of time and sequentially displaying the channels on a picture-in-picture (PIP) screen.

13 Claims, 5 Drawing Sheets

CHANNEL TUNING METHOD AND TELEVISION USING CHANNEL NAME AUTO COMPLETION FUNCTION

BACKGROUND OF THE INVENTION

This application claims the priority of Korean Patent Application No. 2002-3285, filed on Jan. 21, 2002, in the Korean Intellectual Property Office, the disclosure of which is incorporated herein in its entirety by reference.

1. Field of the Invention

The present invention relates to a channel tuning method and a television, and more particularly, to a channel tuning method and a television using a channel name auto completion function where similar channel names are searched based on one or more of the characters of a channel name input by a predetermined inputting unit, the searched channel names are displayed on a list; and so as to aid a user in selecting a channel, a corresponding channel among channels corresponding to the channel names displayed on the list is automatically tuned for a predetermined interval of time, and the channels are sequentially displayed on a picture-in-picture (PIP) screen.

2. Description of the Related Art

Currently, as digital televisions are being widely used, some broadcasting stations provide digital broadcasting for some broadcasting programs. Accordingly, digital broadcasting can be broadcasted on a number of broadcasting channels compared to the prior art analog broadcasting, and digital televisions are able to receive a number of channels compared to the prior art analog televisions. In this respect, more broadcasting stations will broadcast more channels down the line. As the number of channels increases, it will be more difficult for a user to search a desired channel or broadcasting program. Thus, in order to easily search a desired channel or broadcasting program, an electronic program guide (EPG) or search screen has been provided. In the EPG, a desired broadcasting program can be searched using a direction key or arrow key of a remote control, and in the search screen, a desired channel can be searched by inputting the name of a desired channel using a remote control. However, in the EPG, searching for a desired channel using a direction key consumes a great amount of time, and causes inconvenience to the user. Also, in the search screen, it is harder to input channel names due to the limited number of keys provided on the remote control.

Thus, in order to solve these problems, when one or more of the characters of channel names is input in the search screen, a conventional television has a channel name auto completion function to automatically show the channel names that start with the input characters. Here, the channel names of a corresponding broadcasting channel are input by the user or are received from the corresponding broadcasting channel and stored in a memory.

FIG. 1 is a block diagram of a conventional television having a channel name auto completion function. Referring to FIG. 1, the conventional television having a channel name auto completion function includes a controller 10, a display 20, a memory 30, a tuner 40, a remote control receiver 50, and a remote control 60.

A user who wishes to change a channel inputs a character key 62 of the remote control 60 corresponding to one or more of the characters of channel names of a channel desired to be tuned, so the remote control 60 transmits a remote control signal. Here, the character key 62 may be a plurality of alphabet keys or a plurality of number keys. The transmitted remote control signal is received by the remote control receiver 50. The received remote control signal is input into the controller 10, such that a corresponding key of the remote control input by the user is determined and the determined key is displayed on a user input window 25 of the display 20. Also, the controller 10 performs a similar channel name search function 12 to search broadcasting channel names that start with the characters input by the user by referring to a broadcasting channel name list 32 and a broadcasting channel number list 34, both of which are stored in the memory 30. Next, the controller 10 performs a similar channel name display function 14 to display the searched similar channel names on the user input window 25 of the display 20. In this case, when the channel name which the user wants is displayed on the user input window 25 of the display 20, the user presses a predetermined key, for example, a confirmation key 64, on the remote control 60, such that the controller 10 controls the tuner 40 such that the channel corresponding to the channel name is tuned.

Now, a channel name auto completion function will be described based on the contents displayed on the user input window 25 of the display 20 with reference to FIGS. 2A through 2C.

First, if the user inputs a character A using a remote control, the character A is displayed on the user input window 25 of the display 20, as shown in FIG. 2A. Next, a controller (10 of FIG. 1) searches channel names starting with the character A, from a memory (30 of FIG. 1). As a result of searching, the controller displays a searched channel name "ABC" on the user input window 25, as shown in FIG. 2B. When the channel name of a channel which the user desires is the searched channel name "ABC", the user presses the confirmation key (64 of FIG. 1) of a remote control (60 of FIG. 1), so the desired channel is tuned and viewed.

However, if the channel name of the channel which the user desires is different from the searched channel name "ABC", the user inputs a character C following the initially input character of which is A. Then, the controller searches channel names starting with a character combination of AC from the memory. As a result of searching, the controller displays a channel name "ACTV" on the user input window 25, as shown in FIG. 2C. If the channel name which the user desires is the searched channel name "ACTV", the user presses the confirmation key of the remote control, so the desired channel is tuned and is viewed.

As described above, in a conventional channel tuning method using a channel name auto completion function, a list of similar channel names, searched based on one or more of the characters of a channel name input by the user, is not provided. Accordingly, if there are more than one similar channel name, the user cannot easily search a desired channel.

Also, if a channel name itself is uncertain, it is not easy for the user to verify whether a channel corresponding to an auto completed channel name is the desired channel.

SUMMARY OF THE INVENTION

The present invention provides a channel tuning method using a channel name auto completion function, in which similar channel names are searched based on one or more of the characters of a channel name input by a predetermined inputting unit, the searched channel names are displayed on a list, and so as to help a user select a channel, a corresponding channel among channels corresponding to the channel names displayed on the list is automatically tuned for a predetermined interval of time, and the channels are sequentially displayed on a picture-in-picture (PIP) screen.

The present invention also provides a television where similar channel names are searched based on one or more of the characters of a channel name input by a predetermined inputting unit; the searched channel names are displayed on a list; and so as to help a user select a channel, a corresponding channel among channels corresponding to the channel names displayed on the list is automatically tuned for a predetermined interval of time, and the channels are sequentially displayed on a picture-in-picture (PIP) screen.

According to an aspect of the present invention, there is provided a channel tuning method using a channel name auto completion function in which the entire channel name of a corresponding channel is automatically completed by inputting part of a channel name of a television broadcasting channel to be tuned using a predetermined inputting unit. The method comprises (a) searching similar channel names based on one or more of the characters of a channel name input by the inputting unit and displaying the searched channel names on a list from which selections can be made, and (b) in order to aid a user in selecting a channel, automatically tuning a corresponding channel among channels corresponding to the channel names displayed on the list for a predetermined interval of time and sequentially displaying the channels on a picture in picture (PIP) screen.

Preferably, in (b), detailed descriptions of the channel displayed on the PIP screen are displayed, or if the user selects one of the channel names displayed on the list, detailed descriptions of a corresponding channel are displayed.

According to another aspect of the present invention, there is provided a television using a channel name auto completion function in which the entire channel name of a corresponding channel is automatically completed by inputting part of a channel name of a television broadcasting channel to be tuned using a predetermined inputting unit. The television includes a user input window placed on part of a television screen, in which one or more of the characters of a channel name are input by a user using the inputting unit, a controller to search similar channel names based on one or more of the characters of the channel name input on the user input window and display the searched channel names on a list from which selections can be made, a memory in which a list of broadcasting channel names needed when the controller searches the similar channel names is stored, a similar channel name list display window placed on part of the television screen, in which the searched channel names are displayed on the list, and a picture-in-picture (PIP) screen on which a corresponding channel among the channels corresponding to the channel names displayed on the similar channel name list display window is automatically tuned by the controller for a predetermined interval of time and the channels are sequentially displayed, so as to help the user select a channel.

BRIEF DESCRIPTION OF THE DRAWINGS

The above and other aspects and advantages of the present invention will become more apparent by describing in detail a preferred embodiment thereof with reference to the attached drawings in which.

DETAILED DESCRIPTION OF THE INVENTION

Hereinafter, a preferred embodiment of the present invention will be described in detail with reference to the accompanying drawings. In describing the present invention, if it is determined that detailed descriptions of related well-known technologies or the structure of the present invention may cause unnecessary ambiguity among essential points of the present invention, detailed descriptions thereof will be omitted. Also, terms, which will be described later, are defined by considering the functions of the present invention and may vary according to users, operator's purposes, or usual practices. Therefore, definitions of terms should be based on the overall contents of the present specification.

Figure 1:
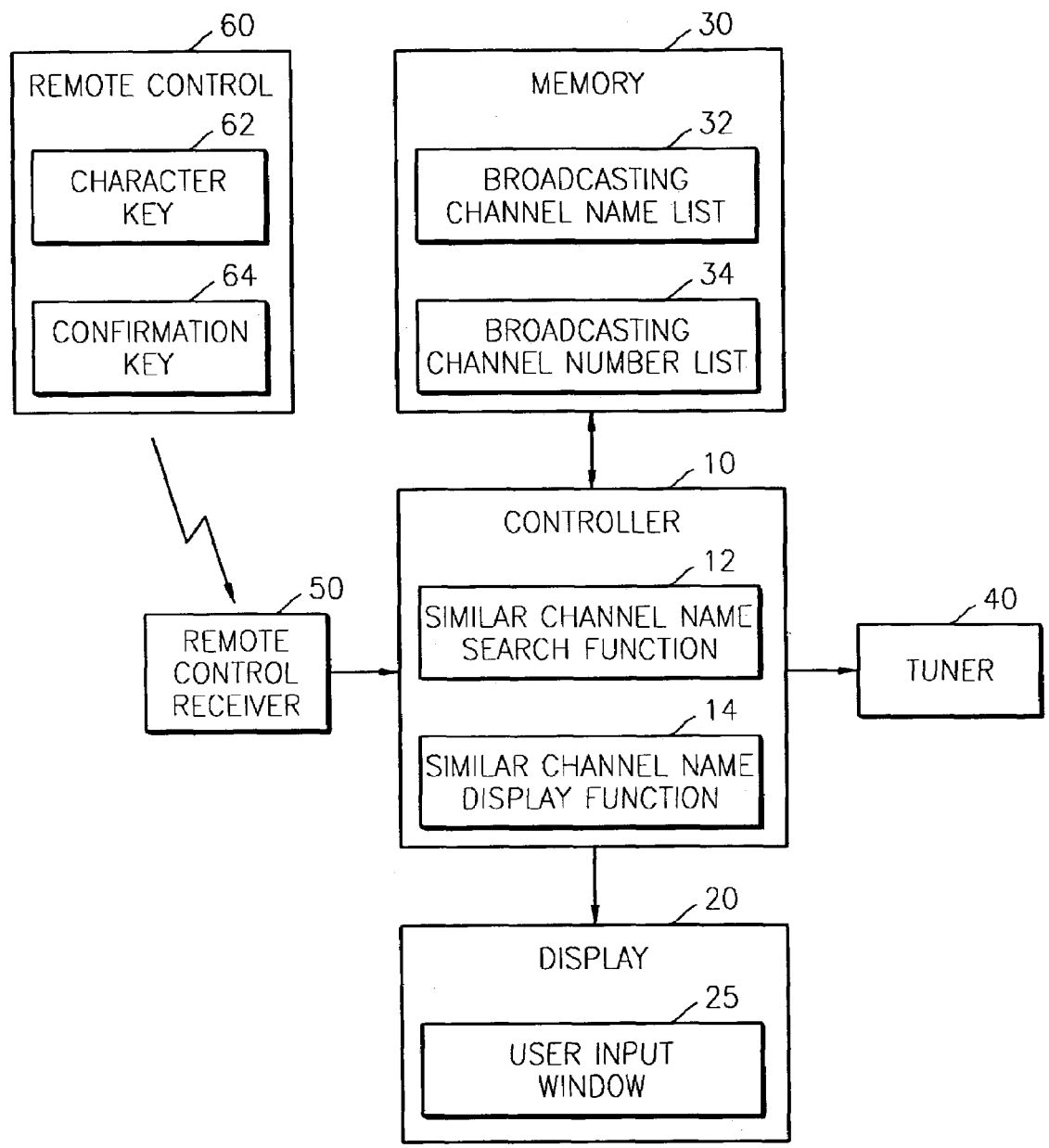
FIG. 1 is a block diagram of a conventional television having a channel name auto completion function.
Figure 2A:
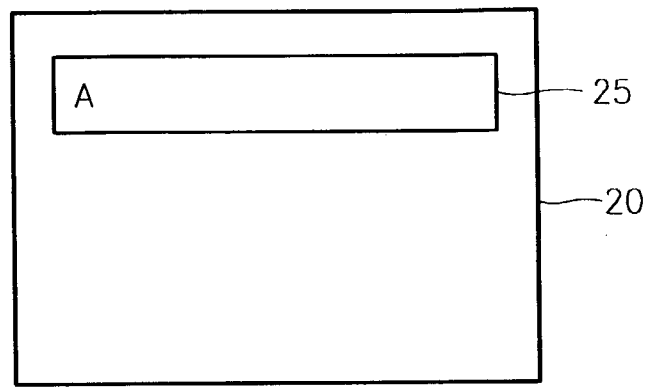
FIGS. 2A through 2C illustrate conventional display screens each having a channel name auto completion function.
Figure 2B:
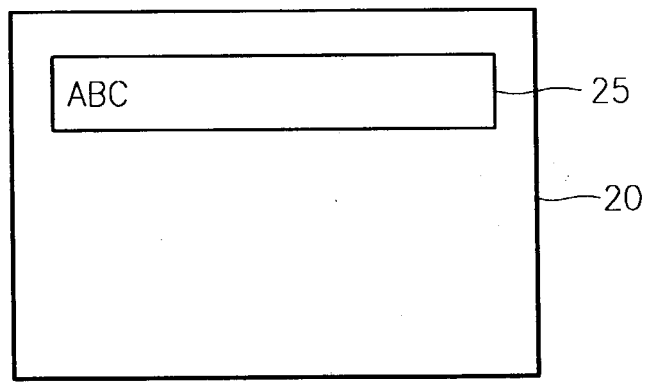
Figure 2C:
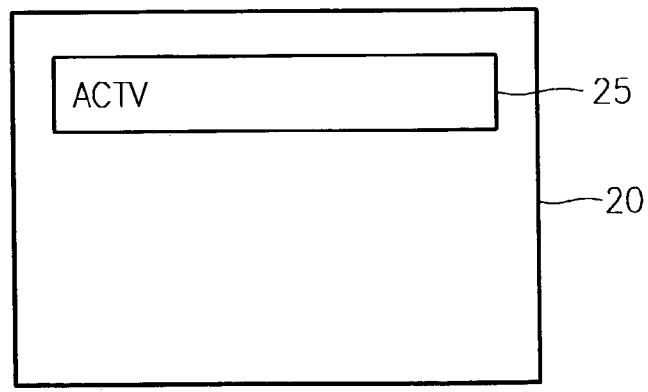
Figure 3:
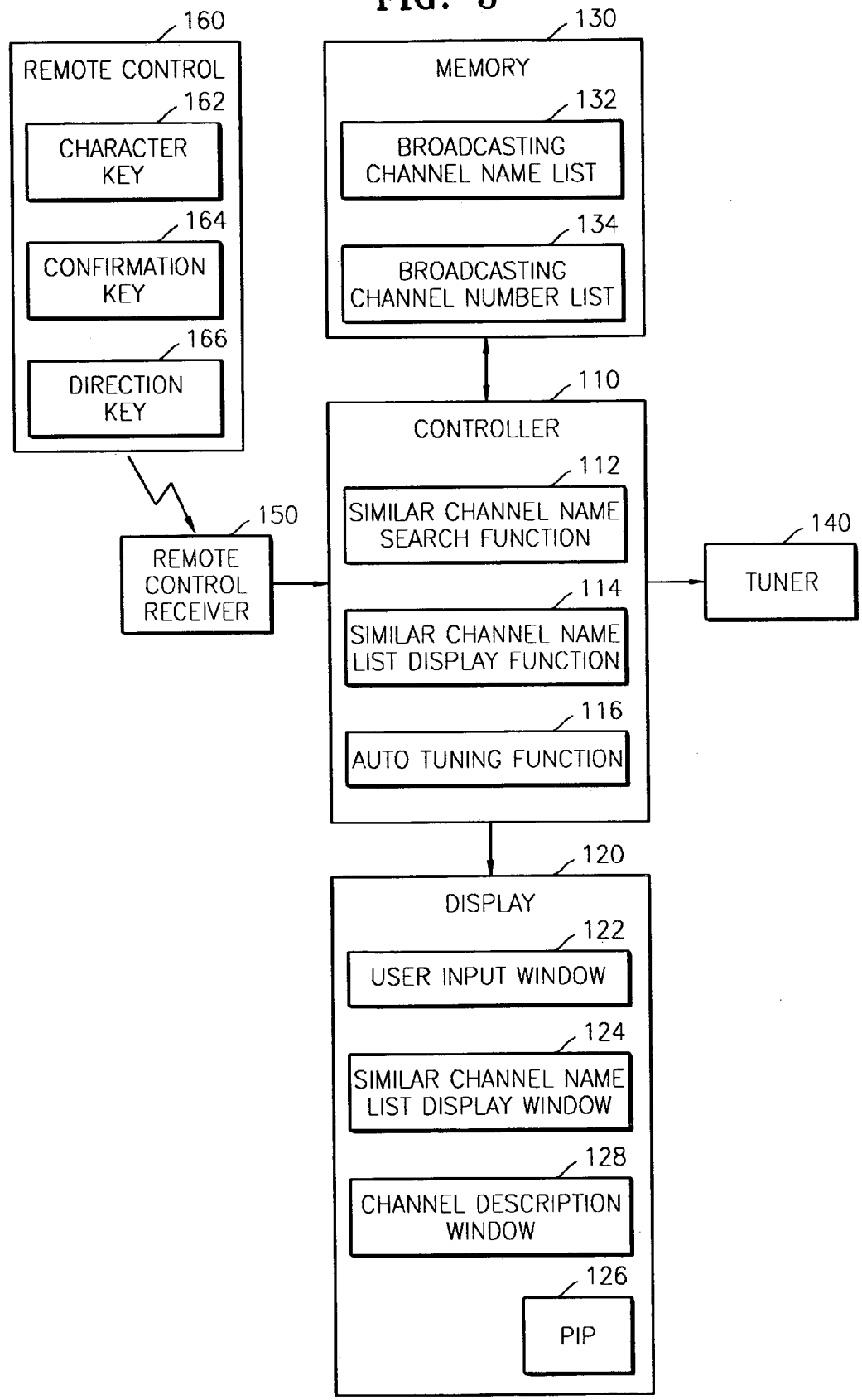
FIG. 3 is a block diagram of a television having a channel name auto completion function according to the present invention.

FIG. 3 is a block diagram of a television having a channel name auto completion function according to the present invention. Referring to FIG. 3, the television having a channel name auto completion function according to the present invention includes a controller 110, a display 120, a memory 130, a tuner 140, a remote control receiver 150, and a remote control 160.

A user who desires to change a channel, inputs a character key 162 of the remote control 160 corresponding to one or more of the characters of a channel name of a desired channel to be tuned, so that the remote control 160 transmits a remote control signal of a corresponding character key. Here, the character key 62 may be a plurality of alphabet keys or a plurality of number keys. The transmitted remote control signal is received by the remote control receiver 150. The received remote control signal is input into the controller 110, such that a corresponding key of the remote control input by the user is determined and the determined key is displayed on a user input window 122 of the display 120. Also, the controller 110 performs a similar channel name search function 112 to search similar channel names based on one or more of the characters of a channel name input by the user, by referring to a broadcasting channel name list 132 and a broadcasting channel number list 134, which are stored in the memory 130. Here, the similar channel names may be channel names that start with one or more of the characters of the channel name input by the user. Next, the controller 110 performs a similar channel name list display function 114 to display at least one of the searched similar channel names on a list from which selections can be made on a similar channel name list display window 124 of the display 120.

In this case, when the channel name which the user desires is displayed on the similar channel name list display window 124 of the display 120, the user selects a desired channel name using a direction key 166 or arrow key of the remote control 160. Here, the channel corresponding to the selected channel name is automatically tuned by an auto tuning function 116 of the controller 110 and is then displayed on a preview window of the display 120, for example, on a picture-in-picture (PIP) screen 126. In this case, the controller 110 controls the tuner 140 so as to tune a corresponding channel. The selected channels are displayed on the PIP screen, such that the user can easily check a desired channel to be tuned among the channels. In this case, if there is an option for the auto tuning function and the user sets the option to be operated, the auto tuning function can be performed. Also, the auto tuning function of channels may be performed immediately when the user selects one of the displayed channel names, or after the selection, such that the auto tuning function of channels may be performed after a predetermined amount of time, for example, five seconds.

Meanwhile, preferably, in order to help the user select a desired channel, the channel corresponding to each of the channel names displayed on the similar channel name list display window, is automatically tuned for a predetermined interval of time by the controller 110 and is then displayed on the PIP screen 126. Also, preferably, a channel name corresponding to the channel displayed on the PIP screen 126 among the channel names displayed on the similar channel name list display window 124, is highlighted. Also, preferably, detailed descriptions of the channel displayed on the PIP screen 126 are displayed on a channel description window 128 of the display 120, to help the user select a desired channel.

Meanwhile, the user selects a desired channel name and then presses a predetermined key on the remote control 160, for example, a confirmation key 164, so that a channel corresponding to the channel name is tuned and is displayed on the entire screen or a main screen.

Now, a channel name auto completion function will be described based on the contents displayed on the user input window 122 of the display 120, the similar channel name list display window 124, and the channel description window 128 with reference to FIGS. 4A through 4D.

Figure 4A:
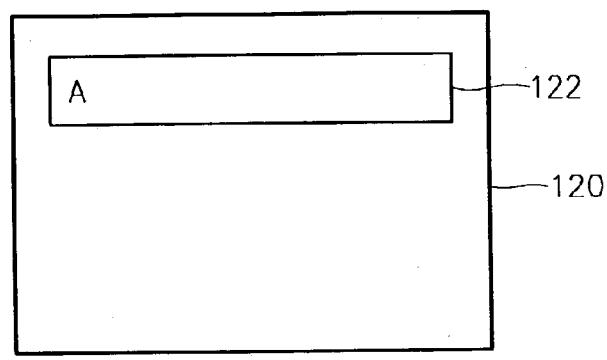
FIGS. 4A through 4D illustrate display screens each having a channel name auto completion function according to the present invention.
Figure 4B:
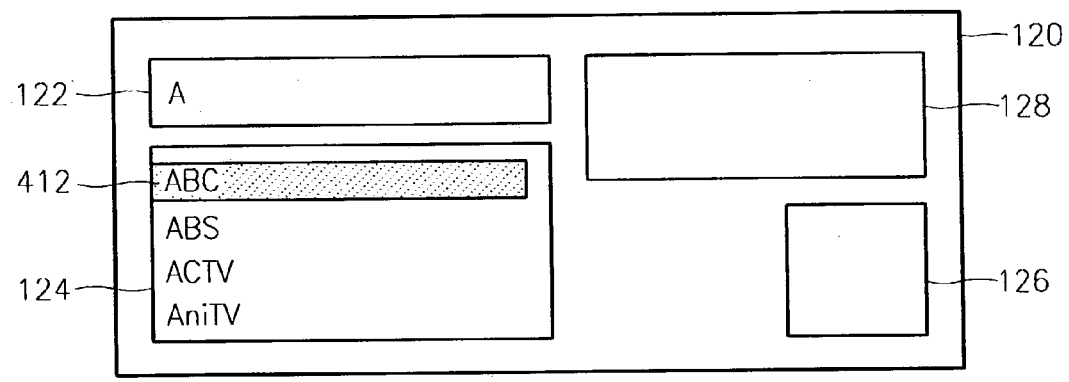

First, if the user inputs a character A using a remote control, the character A is displayed on the user input window 122 of the display 120, as shown in FIG. 4A. Next, a controller (110 of FIG. 3) searches channel names that start with the character A from a memory (130 of FIG. 3). As a result of searching, the controller displays searched channel names on the similar channel name list display window 124, as shown in FIG. 4B.

Figure 4C:
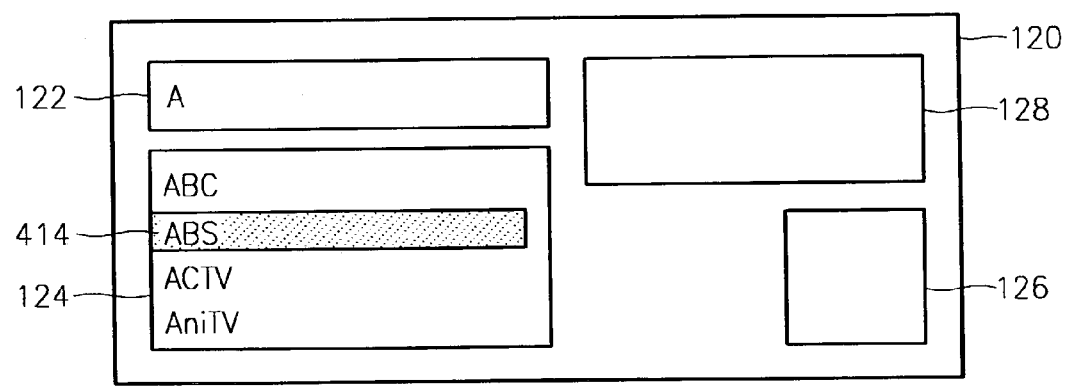

Here, one of the similar channel names may be selected as a default. In FIG. 4B, a channel name "ABC" 412 is selected as a default and is highlighted. In this case, a channel corresponding to the channel name "ABC" 412 is automatically tuned by the auto tuning function and can be displayed on a picture-in-picture (PIP) screen in a preview state. Here, if the channel name that the user desires is "ABS", the user selects a channel name "ABS" 414 using a direction key (166 of FIG. 3) of the remote control, as shown in FIG. 4C. Also, a channel corresponding to the channel name "ABS" is automatically tuned by the auto tuning function and can be displayed on the PIP screen in a preview state. If the channel displayed on the PIP screen is the same as the channel desired by the user, the user presses a confirmation key (164 of FIG. 3) of the remote control, so the channel corresponding to the channel name "ABS" is tuned and can be viewed on the entire screen or main screen.

Meanwhile, preferably, in order to aid the user in selecting a channel, a corresponding channel among channels corresponding to channel names displayed on the list is automatically tuned for a predetermined interval of time, and then, the channels are sequentially displayed on a PIP screen 126. That is, in FIG. 4B, the channel name "ABC" 412 is highlighted, and a channel corresponding to the channel name "ABC" 412 is displayed on the PIP screen 126. Also, preferably, detailed descriptions of the channels displayed on the PIP screen 126 are displayed on a channel description window 128, for example, "ABC channel is a channel only related to golf". Meanwhile, if a channel corresponding to the channel name "ABC" 412 shown in FIG. 4B is displayed on the PIP screen 126 and a predetermined amount of time passes, a channel name "ABS" 414 is highlighted, and a channel corresponding to the channel name "ABS" 414 is displayed on the PIP screen 126, and detailed descriptions of the channels are displayed on the channel description window 128, as shown in FIG. 4C. Then, after a predetermined amount of time, a step for a next channel name is performed as described above.

As described above, in order to aid the user in selecting a channel, while channels corresponding to channel names automatically displayed on a list are sequentially displayed on a PIP screen, if the user selects a desired channel name using a direction key of a remote control, the selected channel name is highlighted. In accordance, a corresponding channel is displayed on the PIP screen along with detailed descriptions of the corresponding channel displayed on a channel description window.

Figure 4D:
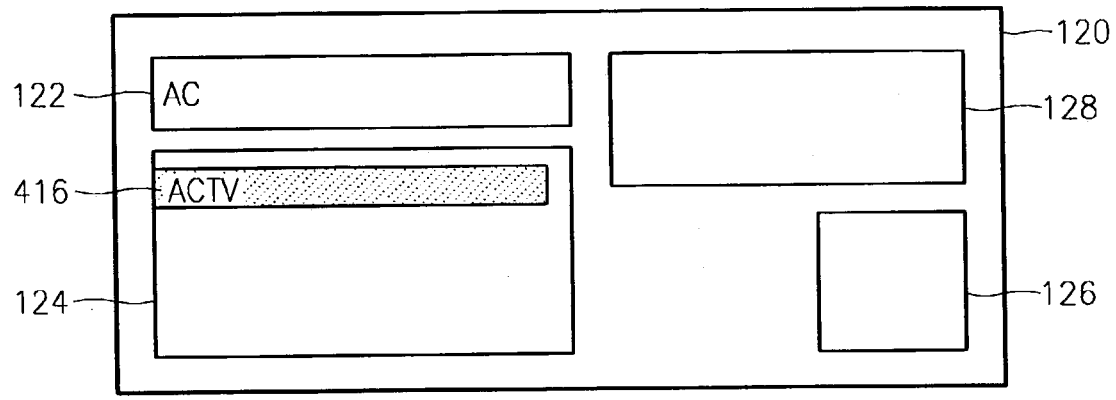

Meanwhile, in FIG. 4B, if the user inputs a character C using the remote control, as shown in FIG. 4D, a character "AC" is displayed on the user input window 122 of the display 120, and a similar channel name "ACTV" 416 searched by the controller is displayed on the similar channel name list display window 124 and is selected as a default. Similarly, a corresponding channel among channels corresponding to the channel name "ACTV" is automatically tuned by the auto tuning function and can be displayed on the PIP screen in a preview state. If the channel displayed on the PIP screen is the same as the channel desired by the user, the user presses the confirmation key of the remote control, so the channel corresponding to the channel name "ACTV" is tuned and is viewed on the entire screen or main screen.

Now, a channel tuning method using a channel name auto completion function according to the present invention will be described with reference to FIG. 5.

Figure 5:
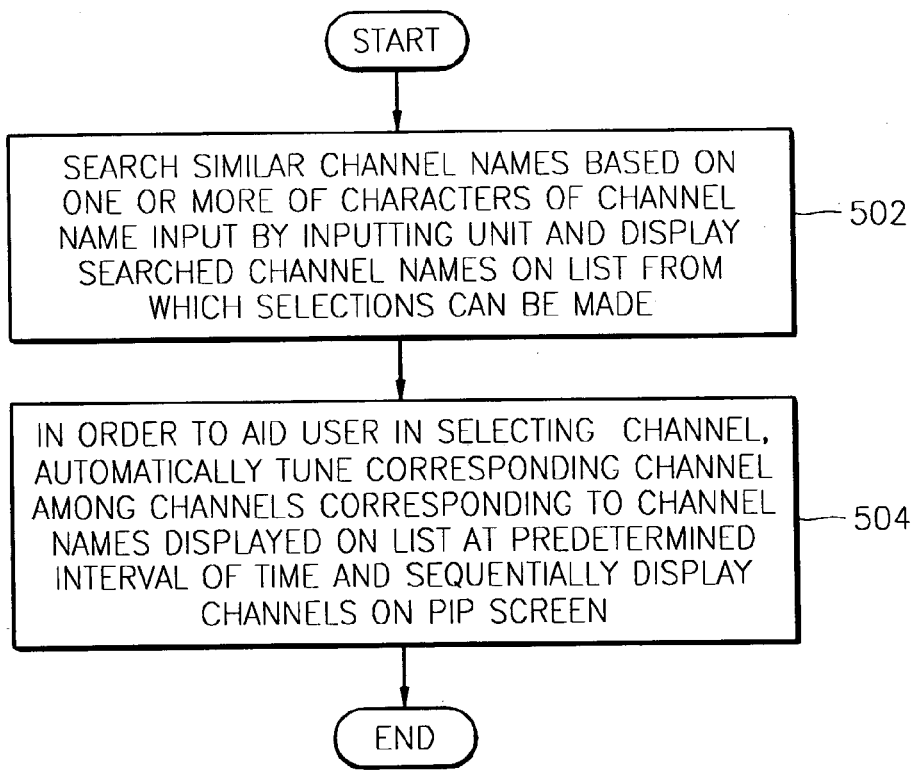
FIG. 5 is a flowchart illustrating a channel tuning method using a channel name auto completion function according to the present invention.

As shown in FIG. 5, in the channel tuning method using a channel name auto completion function according to the present invention, part of a channel name of a television broadcasting channel to be tuned is input using a predetermined inputting unit, e.g., the remote control, so that the entire channel name of a corresponding channel is automatically completed. The channel tuning method comprises searching similar channel names based on one or more of the characters of a channel name input by the inputting unit and displaying the searched channel names on a selectable list (step 502). In order to help a user select a channel, a corresponding channel among channels corresponding to the channel names displayed on the list is automatically tuned for a predetermined interval of time, and the channels are sequentially displayed on the PIP screen (step 504).

As described above, in the channel tuning method and the television using a channel name auto completion function, similar channel names are searched based on one or more of the characters of a channel name input by a predetermined inputting unit; the searched channel names are displayed on a list; a corresponding channel among channels corresponding to the channel names displayed on the list is automatically tuned for a predetermined interval of time, and the channels are sequentially displayed on a picture-in-picture (PIP) screen, so the user can easily select a desired channel.

In addition, detailed descriptions of channels displayed on the PIP screen are displayed, so the user can easily check a desired channel to be tuned among the channels.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A channel tuning method using a channel name auto completion function in which an entire channel name of a corresponding channel is automatically completed by inputting part of a channel name of a television broadcasting channel to be tuned using a predetermined inputting unit, the method comprising:
   (a) searching similar channel names based on one or more characters of a channel name input by the inputting unit and displaying the searched channel names on a list from which selections can be made; and
   (b) without further user input, automatically sequentially tuning and displaying for a predetermined interval of time on a picture in picture (PIP) screen channels corresponding to the displayed channel names.

2. The method of claim 1, wherein in (b), a channel name corresponding to the channel displayed on the PIP screen among the channel names displayed on the list are highlighted.

3. The method of claim 1, wherein in (b), detailed descriptions of the channels sequentially displayed on the PIP screen are displayed.

4. The method of claim 2, wherein in (b), detailed descriptions of the channels sequentially displayed on the PIP screen are displayed.

5. The method of claim 1, wherein in (b), if the user selects one of the channel names displayed on the list, detailed descriptions of a corresponding channel are displayed.

6. The method of claim 2 wherein in (b), if the user selects one of the channel names displayed on the list, detailed descriptions of a corresponding channel are displayed.

7. The method of claim 1, further comprising (c) if the user selects one of the channel names displayed on the list, displaying a channel, corresponding to the selected channel name, on the PIP screen.

8. The method of claim 7, wherein in (c), a detailed description of the corresponding channel, which is displayed on the PIP screen, is displayed.

9. The method of claim 1, wherein in (a), the input characters include at least one of letters and numbers.

10. A television using a channel name auto completion function in which the entire channel name of a corresponding channel is automatically completed by inputting part of a channel name of a television broadcasting channel to be tuned using a predetermined inputting unit, the television comprising:
   a user input window placed on a first part of a television screen, in which one or more of the characters of a channel name are input by a user using the inputting unit;
   a controller to search similar channel names based on one or more of the characters of the channel name input on the user input window and display the searched channel names on a list from which selections can be made;
   a memory in which a list of broadcasting channel names needed when the controller searches the similar channel names is stored;
   a similar channel name list display window placed on a second part of the television screen, in which the searched channel names are displayed on the list; and
   a picture-in-picture (PIP) screen on which, without further user input, channels corresponding to the displayed channel names on the similar channel name list display window are automatically sequentially tuned and displayed for a predetermined interval of time by the controller.

11. The television of claim 10, wherein a channel name corresponding to the channel displayed on the PIP screen among the channel names displayed on the similar channel name list display window, are highlighted.

12. The television of claim 10, further comprising a channel description window placed on a third part of the television screen, on which detailed descriptions of the channels displayed on the PIP screen are displayed.

13. The television of claim 11, further comprising a channel description window placed on a third part of the television screen, on which detailed descriptions of the channels displayed on the PIP screen are displayed.

* * * * *